(12) United States Patent
Mulgrew

(10) Patent No.: US 6,919,032 B2
(45) Date of Patent: Jul. 19, 2005

(54) DISTRIBUTION/RETENTION PLATE FOR MINIMIZING OFF-GASSING

(75) Inventor: Terrance Mulgrew, Pittsburgh, PA (US)

(73) Assignee: Sanist Technologies, Pittsburgh, PA (US)

(*) Notice: Subject to any disclaimer, the term of this patent is extended or adjusted under 35 U.S.C. 154(b) by 270 days.

(21) Appl. No.: 10/411,337

(22) Filed: Apr. 11, 2003

(65) Prior Publication Data

US 2004/0020865 A1 Feb. 5, 2004

Related U.S. Application Data

(60) Provisional application No. 60/371,676, filed on Apr. 12, 2002, and provisional application No. 60/396,008, filed on Jul. 16, 2002.

(51) Int. Cl.$^7$ .................................................. C02F 1/78
(52) U.S. Cl. .................................................... 210/760
(58) Field of Search ........................... 210/760; 422/28, 422/50, 186.07, 186.08; 426/320, 335, 442; 137/209

(56) References Cited

U.S. PATENT DOCUMENTS

| | | | |
|---|---|---|---|
| 5,527,459 A | * 6/1996 | Ikeda et al. ................. 210/188 |
| 5,586,439 A | 12/1996 | Schlosser et al. |
| 5,709,799 A | 1/1998 | Engelhard |
| 5,824,243 A | 10/1998 | Contreras |
| 5,849,148 A | 12/1998 | Walker |
| 5,858,443 A | 1/1999 | Hei et al. |
| 5,951,921 A | 9/1999 | Koganezawa et al. |
| 6,033,544 A | * 3/2000 | Demers et al. ............. 204/450 |
| 6,132,629 A | 10/2000 | Boley |
| 6,132,784 A | 10/2000 | Brandt et al. |
| 6,153,151 A | 11/2000 | Moxley et al. |
| 6,200,618 B1 | 3/2001 | Smith et al. |
| 6,294,211 B1 | 9/2001 | Yuan et al. |
| 6,328,044 B1 | 12/2001 | Crisinel et al. |
| 6,475,902 B1 | * 11/2002 | Hausmann et al. ......... 438/627 |
| 6,494,228 B2 | * 12/2002 | Guillaume et al. ......... 137/209 |
| 6,537,494 B2 | * 3/2003 | Garlick ....................... 422/27 |
| 2001/0047814 A1 | 12/2001 | Nwoko et al. |
| 2002/0094363 A1 | 7/2002 | Traeder et al. |

* cited by examiner

Primary Examiner—Jonathan Johnson
(74) Attorney, Agent, or Firm—Rothwell, Figg, Ernst & Manbeck, P.C.

(57) ABSTRACT

This invention relates to a unique apparatus and method for promoting the efficient use of gases dissolved in a liquid by limiting the amount of off-gassing or evaporation from the liquid. The apparatus and method is a distribution/retention plate, shown in a preferred embodiment as installed in a portable food washing system. The food washing system is a portable unit having a treatment chamber with an access door for the placement of food products on a loading plate. A food product is placed in the chamber and sprayed with ozonated water containing diffuse concentrations of ozone which reacts with and destroys organic contaminants on the food product. The apparatus of the present invention is a distribution/retention plate located at the bottom of the treatment chamber. The distribution/retention plate divides the treatment chamber from a reservoir and controls the rate of ozone off-gassing from the reservoir, thereby maximizing ozone concentration in the water in the reservoir. In alternative embodiments, the distribution/retention plate of the present invention is utilized in automatic ice-making systems, a cooling tower, a commercial conveyor-driven perishable food washing system, and a process water treatment system. By reducing the amount of ozone and water that is necessary to achieve the desired results, the apparatus of the present invention enables the same types and quantities of materials to be treated as other ozone-treatment systems, but at a lower cost and physical size.

38 Claims, 10 Drawing Sheets

DISTRIBUTION/RETENTION PLATE FOR MINIMIZING OFF-GASSING

RELATED APPLICATION

The present application claims priority from U.S. Provisional patent application Ser. No. 60/371,676, filed Apr. 12, 2002 and U.S. Provisional patent application Ser. No. 60/396,008, filed Jul. 16, 2002. The disclosure of the above-referenced provisional patent applications are incorporated herein by reference in their entirety.

FIELD OF THE INVENTION

This invention relates to a unique apparatus and method for promoting the efficient use of gases dissolved in a liquid by limiting the amount of off-gassing or evaporation from the liquid.

BACKGROUND

Development of the present invention was made practical when the Food and Drug Administration approved the safe use of ozone in gaseous and aqueous phases as an antimicrobial agent on food products, including meat and poultry, on Jul. 26, 2001.

The Council for Agriculture Science and Technology estimates that the microbial food-borne disease burden of the United States is in the range of 33 million cases per year and deaths may be as high as 9,000 annually. It has been estimated by the General Accounting Office in a study of food-borne diseases that such illnesses cost the U.S. economy up to 37.1 billion dollars annually in medical costs and lost productivity. The number of food-borne diseases is likely to rise as trade between nations increases. It is extremely difficult to maintain proper inspection standards when inspectors are caught in a conflict between enforcement responsibility and facilitating the flow of goods. Due to multiple original points of distribution and the inability to determine the quality of prior handling methods it is beneficial to apply this technology as close to the plate as possible.

Ozone, a naturally occurring allotrope of oxygen, is a powerful disinfectant that kills microbial contaminants by rupturing the cellar membrane in a matter of seconds, making reactivation of the cell impossible. For example, ozone kills *Escherichia coli* bacteria at a rate greater than 3,000 times faster than does chlorine. There are no known bacteria or viruses resistant to ozone. In contrast to chlorine, which creates toxic by-products and leaves undesirable tastes and odors in foods, ozone leaves no chemical residue on foods and does not alter the product characteristics. Data on ozone is available in any handbook of Chemistry and Physics. The International Ozone Association is a good source for information.

Ozone is considered to be the most effective disinfecting method for maintaining water quality, and is the disinfectant of choice for bacteria and viruses in most water applications. Applications of ozone technology include commercial and residential swimming pools and spas, life support systems for aquariums and hatcheries, cooling towers for process and comfort cooling, pulp and paper treatment, irrigation and wastewater, bottled water plants, ultra pure water, biotechnology and pharmaceutical processes, ice making equipment, and disinfection of food products.

Generally, when ozone is used as a disinfectant, it is first dissolved in water. The ozonated water is then applied to the surface of the material to be disinfected. In ice making applications, the ozonated water is subsequently frozen. In some applications, ozone in gaseous form is used as a disinfectant. Ozonated water is much more efficient than gaseous ozone, however, because a greater concentration of ozone can be applied directly to the surface of the material to be disinfected. Additionally, the direction of ozone application can be more closely controlled.

Although ozone is highly unstable and breaks down quickly, especially in sunlight, it is desirable to minimize ozone introduction to the atmosphere when using it for purposes of disinfection. To this end, many processes employ an ozone destruct system that would prevent the process from exceeding the maximum indoor ozone concentration levels that are acceptable by the various government regulatory agencies (FDA regulation is 0.05 ppm with a 24 hour a day exposure and OSHA Standards are levels above 0.1 ppm based on 8 hours per day/6 days per week) by utilizing ultraviolet light, a bed of manganese dioxide catalyst, or the like. Nevertheless, a certain amount of ozone is likely to escape in any commercial process, and therefore it is desirable to utilize ozone as efficiently as possible to minimize the amount of ozone necessary for the process. For more information on indoor ozone, please refer to *Ozone: Important Information on Ozone and Electronic Air Cleaners*, published by Honeywell, the disclosure of which is hereby incorporated by reference.

SUMMARY OF THE INVENTION

This invention relates to a unique apparatus and method for promoting the efficient use of gases dissolved in a liquid by limiting the amount of off-gassing or evaporation from the liquid. The apparatus and method is a distribution/retention plate, shown in a preferred embodiment as installed in a portable food washing system. The food washing system is a portable unit having a treatment chamber with an access door for the placement of food products on a loading plate. A food product is placed in the chamber and sprayed with ozonated water containing diffuse concentrations of ozone which reacts with and destroys organic contaminants on the food product. The apparatus of the present invention is a distribution/retention plate located at the bottom of the treatment chamber. The distribution/retention plate divides the treatment chamber from a reservoir and controls the rate of ozone off-gassing from the reservoir, thereby maximizing ozone concentration in the water in the reservoir. In alternative embodiments, the distribution/retention plate of the present invention is utilized in automatic ice-making systems, a cooling tower, a commercial conveyor-driven perishable food washing system, and a process water treatment system. By reducing the amount of ozone and water that is necessary to achieve the desired results, the apparatus of the present invention enables the same types and quantities of materials to be treated as other ozone-treatment systems, but at a lower cost and physical size.

BRIEF DESCRIPTION OF THE DRAWINGS

The drawing of FIG. 1 is a partially schematic, partially diagrammatic view of the apparatus of this invention.

DETAILED DESCRIPTION OF THE PREFERRED EMBODIMENT

Figure 1:
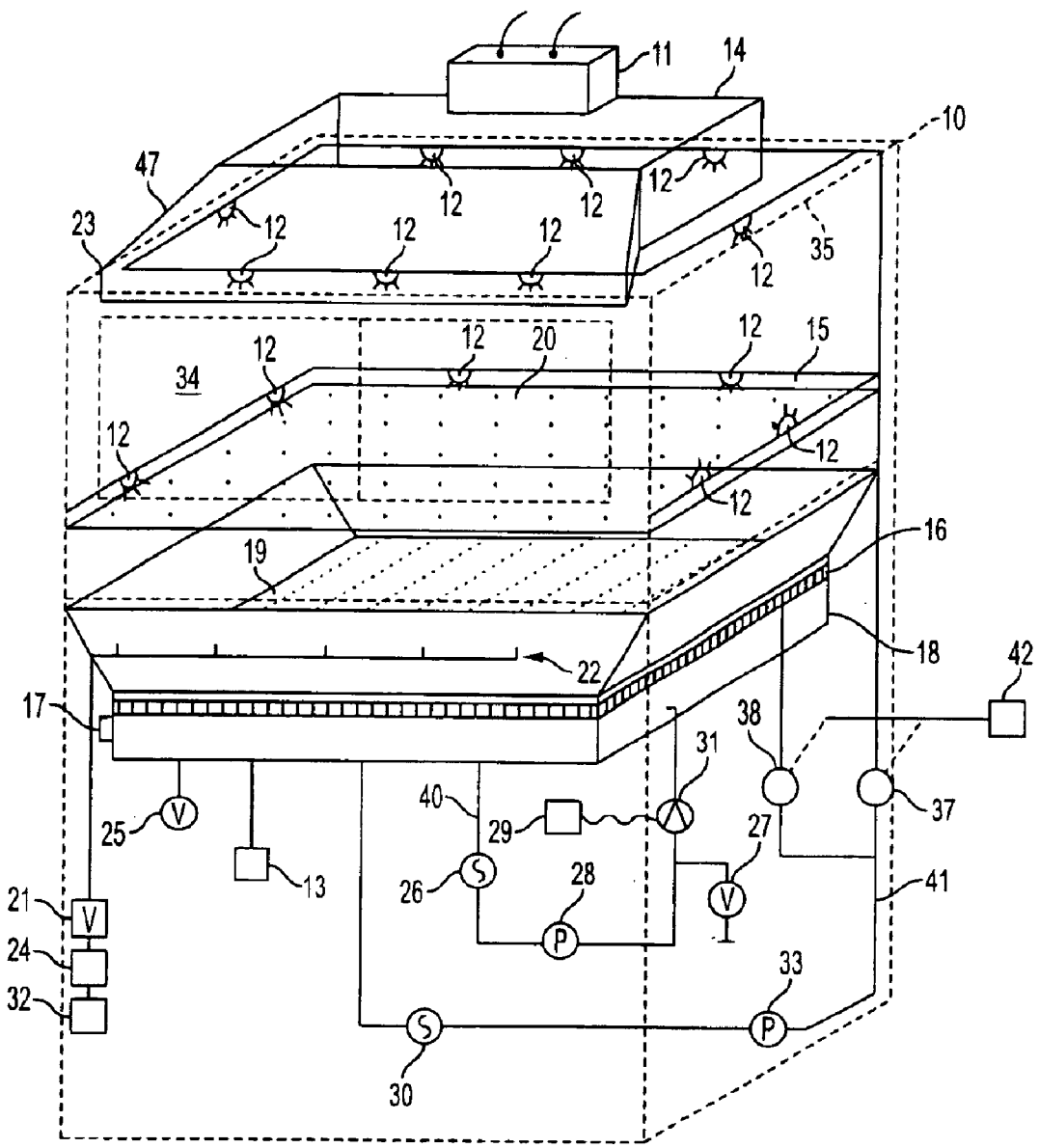

With reference to FIG. 1, system 10 contains all of the elements of the invention and is of such size that it may be placed in a supermarket and used by consumers and/or employees to disinfect food products such as fresh produce. The system 10 includes an enclosed containment housing 23, an off-gas destruct housing 14 and an ozone destruct system 11.

Containment housing 23 has enclosing side walls 35 and a treatment chamber access door 20 that opens into treatment chamber 34. Treatment chamber 34 contains loading plate 15 which may slide out for loading food products or the like. Below loading plate 15 is a washable and removable particulate drain filter 19. At the bottom of treatment chamber 34 is manual drain valve 25 and distribution/retention plate 16, shown in more detail in FIGS. 2–4 and described in more detail below. Particulate drain filter 19 is sized so as to collect overflow product particles from loading plate 15 without impeding the flow of water to or causing clogging of the openings in distribution/retention plate 16. The top of treatment chamber 34 contains a plurality of spray nozzles 12 with conical or square shaped spray patterns that project the spray at various angles, the angles to be determined by the placement of the nozzles so as to provide maximum spray coverage of the product surface. In addition, a plurality of spray nozzles 12 with a flat spray pattern are positioned level with the top of the loading plate and provide a flushing effect to the underside of the product. The pressure of the water in the spray line should be maintained at a minimum (approximately 10 p.s.i) to minimize damage to the product tissue and to prevent mechanical stripping of the ozone from the ozonated water as it exits the spray nozzles from a plurality of directions. The velocity of each spray, which comprises dissolved and undissolved ozone, is sufficient to contact and wet the microbes that are adhered to the surface of the product.

Below distribution/retention plate 16 is reservoir 18. The reservoir maintains a supply of ozonated water for use in the system. Water level in the reservoir is maintained by water level switch 17. A water level is maintained in the reservoir that will not impede the flow of water through the downward flow passages. The distance between the top of the water level and the bottom of the distribution/retention plate determines the volume available for off-gassing. As the volume of space above the water level in the reservoir decreases, the pressure in the reservoir will increase at a faster rate.

When additional makeup water is required water level switch 17 operates water inlet solenoid valve 21, filling the reservoir by makeup water supplied through pressure regulator 32, inlet filter 24, and water fill distributor 22. The reservoir contains manual drain valve 25 that can be operated to drain the reservoir for maintenance purposes. If water inlet solenoid valve 21 should fail open, a water overflow tube that flows to drain (not shown) is provided in the treatment chamber below the loading plate.

Ozone is introduced into the system through ozonated water supply line 40. Ozonated water supply line pump 28 draws water from reservoir 18 and through ozonated water supply line strainer 26 and venturi injector 31. Ozone is dynamically entrained into the motive water stream by ozone generator 29, which provides ozone to the suction port of the venturi injector via an ozone supply line that includes a check valve (not shown) to prevent water from flowing to the ozone generator. The ozone generator can be any commercial ozone generating apparatus, such as a corona discharge system or ultraviolet light system. As the jet stream is diffused toward the venturi injector outlet its velocity is reduced and is converted into pressure energy (but at a pressure lower than the injector inlet pressure). The ozone-entrained water flows from the outlet of venturi injector 31 back to reservoir 18 to complete the recirculation cycle. Ozone monitor/controller 13 senses the level of ozone in treatment chamber 34 and adjusts ozone production from ozone generator 29 accordingly. Additionally, purge valve 27, located off of ozonated water supply line 40, provides a mechanism to purge a portion of the water from the system and is actuated by a programmable controller that monitors minutes of operation and number of cycles between cleanings. The purge is necessary to maintain a balanced pH in the treatment water and provides a method to remove various types of organic and inorganic ozone-demanding materials that cannot be filtered. The programming of the controller will be determined by the operating conditions.

Ozonated water is supplied to spray nozzles 12 by spray line 41. Spray line pump 33 draws ozonated water from reservoir 18 through spray line strainer/filter 30. Further, either spray line 41 or ozonated water supply line 40 may include a pressure switch (not shown) having an actuation setpoint above normal operating pressures. If the system encounters a flow obstruction (for example, a clogged venturi injector or spray nozzle(s)), the pressure switch will actuate to shut the system down. Returning to normal system operation, when a food product or the like has been loaded into treatment chamber 34 and placed on loading plate 15, spray nozzle solenoid valve 37 is open and distribution/retention plate feed solenoid valve 38 is closed in order to provide ozonated water to spray nozzles 12, which apply ozonated water to the food product. When a product is to be loaded into or removed from treatment chamber 34, the user operates spray line switch 42, which closes spray nozzle solenoid valve 37 and opens distribution/retention plate feed solenoid valve 38. Alternatively, the cycling of spray nozzle solenoid valve 37 and distribution/retention plate feed solenoid valve 38 could be linked to a switch on treatment chamber access door 20 that operates when the door is opened. Water flowing through distribution/retention plate feed solenoid valve 38 is directed onto distribution/retention plate 16, ensuring that each downward flow passage 43 on distribution/retention plate 16 is maintained in a flooded condition, the advantage of which will be described below.

Figure 2:
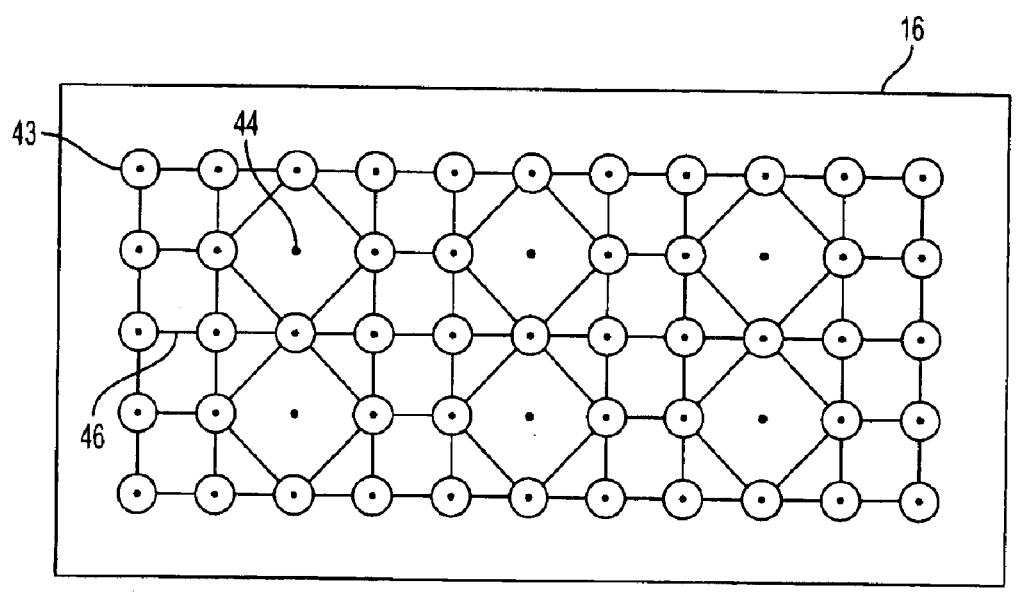
FIG. 2 is a top view of the distribution/retention plate.
Figure 3:
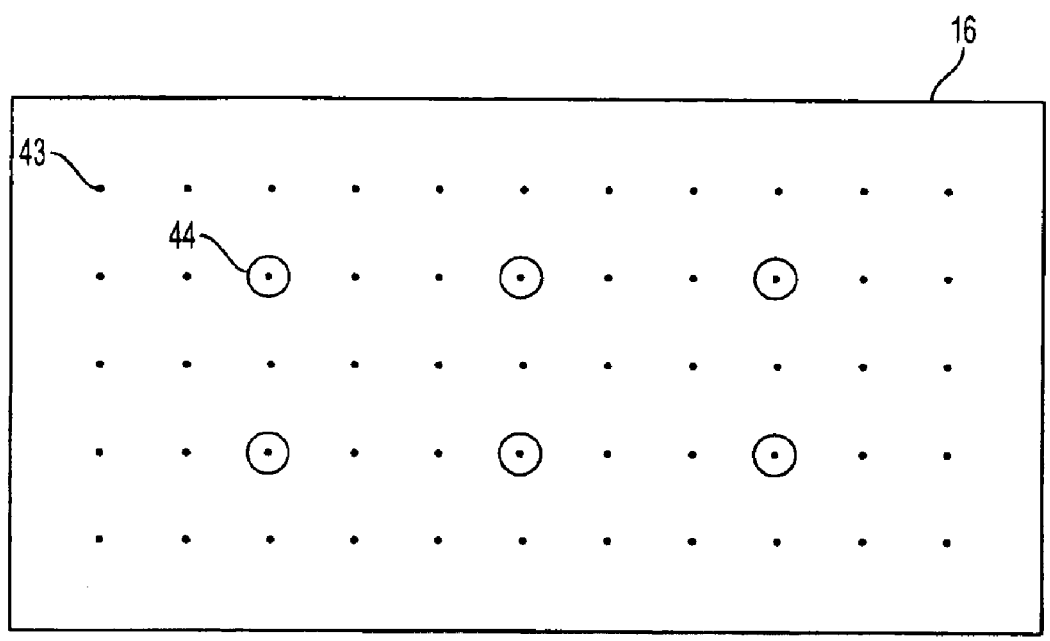
FIG. 3 is a bottom view of the distribution/retention plate.
Figure 4:
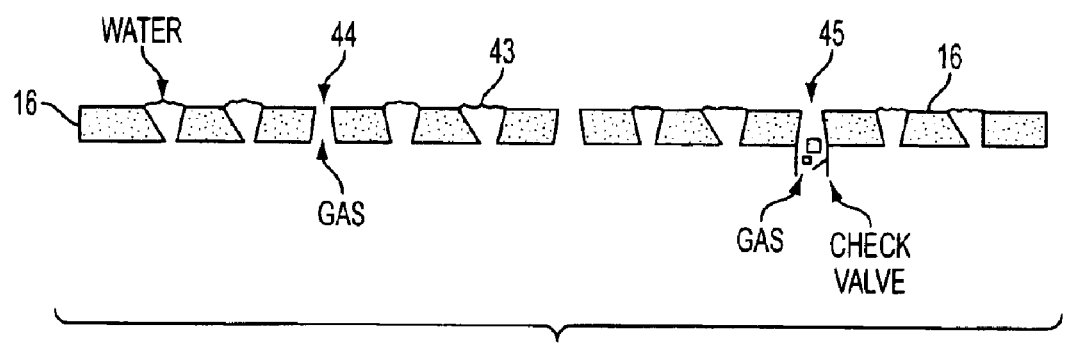
FIG. 4 is a sectional elevation view of the distribution/retention plate.

With reference to FIGS. 2, 3, and 4, maximization of the amount of ozone in reservoir 18 is a key consideration in the design of distribution/retention plate 16. The ozone concentration of the reservoir water is maximized by regulating the amount of off-gassing from reservoir 18 through the flow passages in distribution/retention plate 16. Off-gassing from the ozonated water in reservoir 18 will rise into upward flow passages 44, which have a larger diameter at the bottom of distribution/retention plate 16 and taper to a smaller diameter at the top of the distribution/retention plate. The smallest diameter of upward flow passage 44 is sized to maximize the pressure in reservoir 18 by allowing for a flow of gas that will maintain a pressure in the reservoir that is lower than the pressure of the water that is draining through downward flow passages 43 from treatment chamber 34. If the smallest diameter of the upward flow passage is not at the top of the upward flow passage, then the distance between these two points supports a column of liquid that is measured in inches of water column (which corresponds to pressure) and provides a minimum operating pressure in the reservoir when all of the downward and upward flow passages are in a flooded condition. The column of liquid that is supported in the flooded upward flow passage is less than the column of liquid that is supported in the flooded downward flow passage, which provides a minimum pressure under retention/distribution plate 16 without stopping the downward flow of liquid. At the beginning of the treatment cycle when all of the passages are flooded the pressure in the reservoir begins at atmospheric pressure and increases faster than if the upward flow passages were not flooded due to the flooding of the upper end of the upward flow passage, thereby maintaining a minimum operating pressure in the reservoir.

The distribution/retention plate can function with only one downward flow passage and one upward flow passage. Increasing the number of downward and upward flow passages, however, improves the efficiency and operating conditions of the system. As the number of downward flow passages increases, the water flowing from the treatment chamber is distributed to the surface of the water in the reservoir more evenly, improving the mixing efficiency in the reservoir. Increasing the number of upward flow passages provides for a more equal distribution of off-gassing under the loading plate, which helps to increase the efficiency of the treatment process. Further, increasing the number of passages in the distribution/retention plate with the same system flow rate will allow for a decrease in the smallest dimension of the downward and upward flow passages.

In order to minimize the amount of water or gas that bypasses the distribution/retention plate, there should be a seal between the distribution/retention plate and the inside walls of the system. This seal can be accomplished through any number of methods that would be apparent to one skilled in the art. For example, the components of the system could be designed and machined so that the distribution/retention plate and inside walls of the system are sealingly engaged. This would minimize the flow of liquid around the distribution/retention plate into the reservoir from the treatment chamber and minimize the flow of gas around the distribution/retention plate into the treatment chamber from the reservoir. If a stronger seal is desired, a gasket, o-ring, or the like can be used to further minimize the amount of liquid and gas that bypasses the distribution/retention plate. Further, if a gasket seal is utilized at the bottom perimeter of the distribution/retention plate, and if a gap remains above this gasket seal between the distribution/retention plate and the inside walls of the system, the gap will fill with water when the system is in operation. The water in this gap will provide an additional liquid seal.

A portion of undissolved ozone molecules flow to the suction of spray line pump 33 and ozonated water supply line pump 28. Spray line pump 33 delivers a portion of the ozone molecules to the surface of the product, and the remainder off-gasses in the treatment chamber. Ozonated water supply line pump 28 returns the undissolved ozone molecules back to the reservoir. The portion of undissolved ozone molecules that do not flow to the pumps flow through upward flow passages 44.

The pressure at any of the downward flow passages is determined by the thickness of the distribution/retention plate. As the thickness of the distribution/retention plate increases, the pressure increases. A thickness of ½ inch allows for a maximum pressure of approximately 0.45 inches of W.C. (0.26 ounces per square inch) above atmosphere in the reservoir without impeding the flow of water through the downward flow passages. A ½ inch thick distribution/retention plate was used for the Nov. 12, 2002 Presque Isle test, described below.

In an alternative embodiment, in addition to being removed by upward flow passages 44, off gassing can be removed from reservoir 18 by a pressure relief device such as one or more check valves 45 or a pressure relief valve and vent line (not shown). When check valve(s) 45 is/are utilized, the off-gassing from the water in reservoir 18 will flow through a check valve or valves that is/are sized to have an opening venting pressure that is less than the pressure of any of the flooded downward flow passages 43. Similarly, a vent line or pressure relief valve, if utilized, would have a venting pressure that is less than the pressure exerted by the water flowing through downward flow passages 43 and could be vented either directly to treatment chamber 34 or to off-gas destruct housing 14. These pressure relief devices will thus help to maximize the amount of ozone dissolved in the water in the reservoir without impeding flow of water through downward flow passages 43.

In a further alternative embodiment, upward flow passages 44 can be completely eliminated and replaced with a pressure relief device as discussed above, as the upward flow passages and pressure relief device serve the same function: maximizing pressure in reservoir 18 without impeding flow of water through downward flow passages 43. Thus, it will be apparent that any combination of upward flow passages and/or pressure relief devices that accomplish this result can be utilized.

Figure 5:
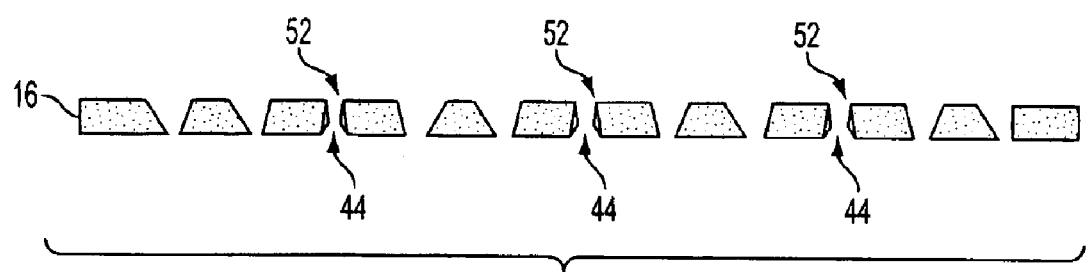
FIG. 5 is a sectional elevation view of the distribution/retention plate in an alternative embodiment.

In another alternative embodiment depicted in FIG. 5, the upper end of each upward flow passage 44 has a tapered recessed cavity that allows for the upper end of the upward flow passage to flood with water at a greater rate.

In the treatment chamber, overflow from loading plate 15 will pass through particulate drain filter 19 and onto distribution/retention plate 16. This water will fill the downward flow passages, which have a larger diameter at the top and taper to a smaller diameter at the bottom. The lower diameter of downward flow passage 43 is sized to maintain all of the passages in a flooded condition in order to prevent any passage of off-gassing through these passages from reservoir 18. As pictured in FIG. 2, each downward flow passage 43 is connected by interconnected downward flow passage channels 46 that allow for the equal distribution of water to all of the downward flow passages.

The design of the distribution/retention plate in the present invention thus maintains a balance between; 1) maximizing the pressure in the reservoir so as to maximize the concentration of ozone in the water; and 2) minimizing the flow resistance of water in the treatment chamber returning to the reservoir.

It is important to maximize the amount of ozone in the water because the ozone generated is utilized most efficiently when it is delivered to the surface of the food product or the like by water instead of by air. The direction of ozone molecules can be controlled more accurately in liquid form by placement of the spray nozzles, as compared to latent air in the system, where their direction is uncontrolled. The result of the design of the present invention is to maximize ozone concentration, thereby allowing the rate of ozone generation to be as low as possible while still ensuring that the food product or the like is disinfected. In order to ensure inactivation of *Escherichia coli*, for example, ozone concentrations as low as 0.1 to 0.2 ppm are sufficient. Efficient use of ozone in the present invention allows for the use of ozone produced by ultraviolet light at a wavelength of 185 nanometers or a corona discharge system that utilizes ambient air as the feed gas. Although the ozone generated is less than one percent by weight, this is sufficient to greatly reduce the biological load of the product in the treatment area, as discussed in more detail below.

Ozone gas that is not utilized in treatment chamber 34 is removed by the suction of a vacuum (not shown) that is located in off-gas destruct housing 14. The intake of the vacuum is located in hood 47 that is attached to the off-gas destruct housing and positioned above treatment chamber access door 20. The location of the hood will prevent any unacceptable levels of ozone (FDA regulation is 0.05 ppm based on 24 hour a day exposure, OSHA Standards are levels above 0.1 ppm based on 8 hours per day/6 days per week) from escaping to ambient air. The vacuum will also maintain a negative pressure in treatment chamber 34 to prevent ozone from escaping when treatment chamber access door 20 is opened to atmospheric air. The ozone gas will pass through off-gas destruct housing 14 and into ozone destruct system 11, converting ozone to oxygen by exposing the ozone gas to either ultraviolet light having a wavelength of 254 nanometers or a bed of manganese dioxide catalyst material, or by utilizing a known thermal decomposition process.

The distribution/retention plate of the present invention could be utilized in any process where it is desirable to increase the pressure on top of a liquid that is contained in a vessel, thus limiting the amount of off-gassing or evaporation from the liquid and providing for the efficient use of gases. The same vessel would also receive the downward flow of liquid from a process where the liquid is applied above the distribution/retention plate. The process utilizes the force of gravity to increase the efficient use of various gases and liquids.

The thickness of the distribution/retention plate and the specific gravity of the liquid determines the maximum pressure that can be achieved above the liquid under the distribution/retention plate. The downward flow passages should be maintained in a flooded condition to prevent any off-gassing or evaporation up through the downward flow passages from the liquid contained in the vessel. The flow rate and the viscosity of the liquid will determine the size and number of downward flow passages. The size and number of upward flow passages will be determined by the volume of off-gassing and/or evaporation from the liquid in the containment vessel. The outlets of the upward flow passages may be above or level with the liquid of the downward flow passages or their connecting channels which will provide a pressure in a range between 0 p.s.i.g. and a maximum pressure that would be less than the liquid pressure of the downward flow passages.

The outlets of the upward and downward flow passage can be tapered or have any shape that would better accommodate the flow of various liquids and gasses. If desired, the passages could be at fixed angles through the distribution/retention plate or the passages could have varying angles through the distribution/retention plate or the size and shape of the passages could vary without affecting the mentioned advantages of the distribution/retention plate. Further, in order to allow for a change in the flow rate of a liquid or gas without changing the distribution/retention plate an orifice can be inserted into a downward or upward flow passage. The distribution/retention plate could be manufactured from any material that is compatible with the process liquid or gas.

Figure 6A:
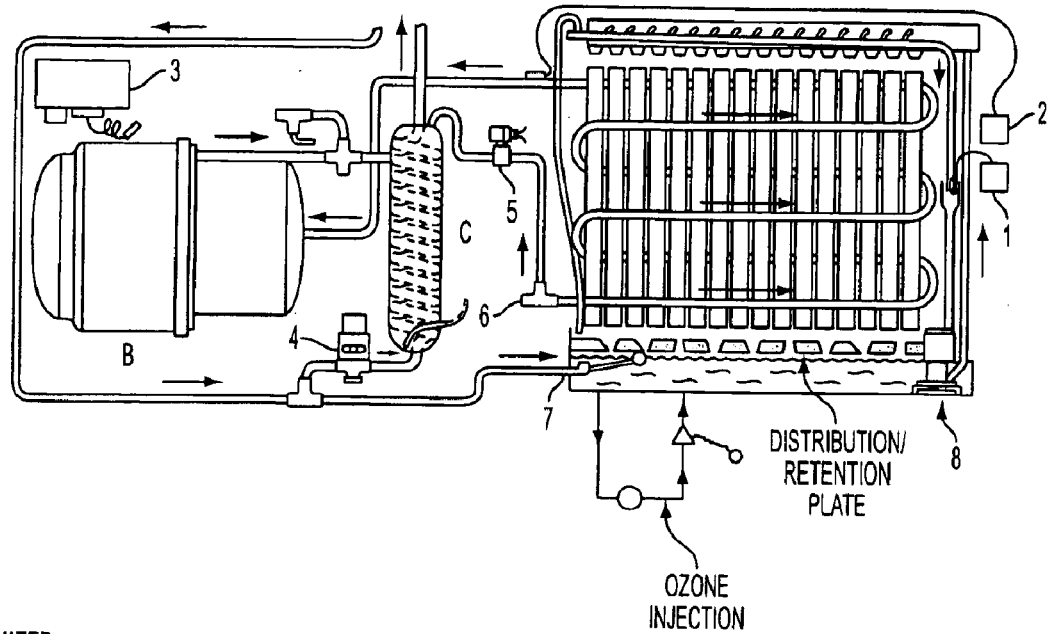
FIG. 6A is a partially schematic, partially diagrammatic view of the distribution/retention plate as applied in one embodiment of an automatic ice-making system.
Figure 6B:
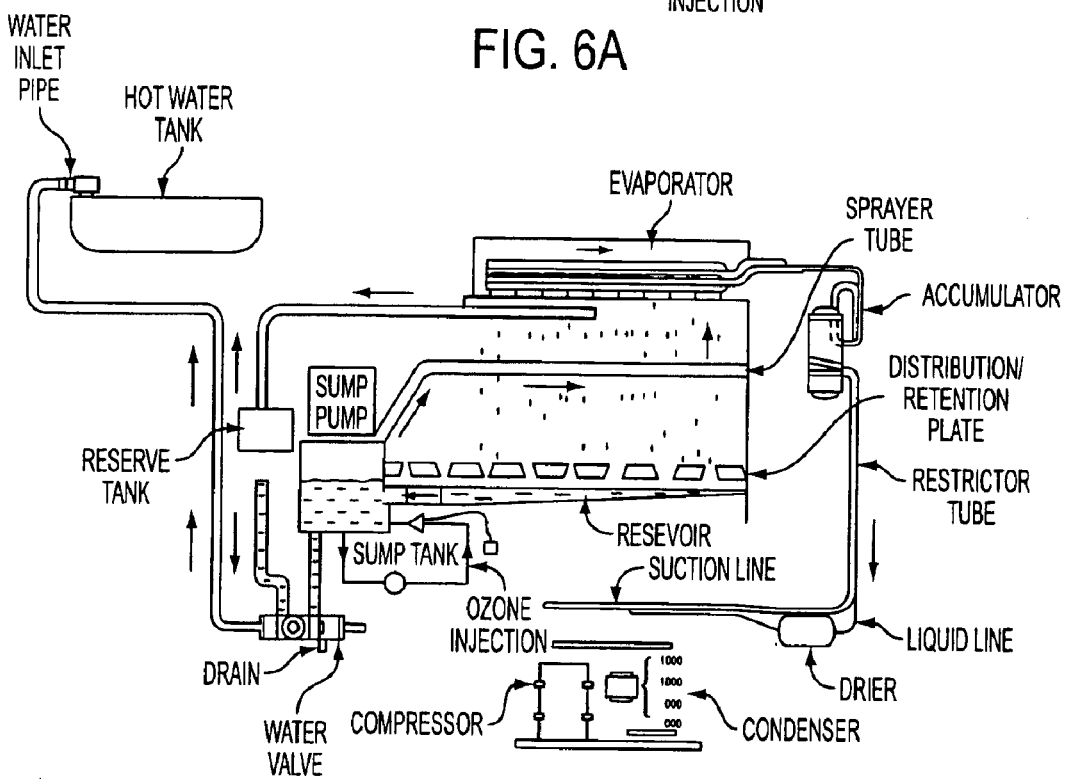
FIG. 6B is a partially schematic, partially diagrammatic view of the distribution/retention plate as applied in another embodiment of an automatic ice-making system.
Figure 7:
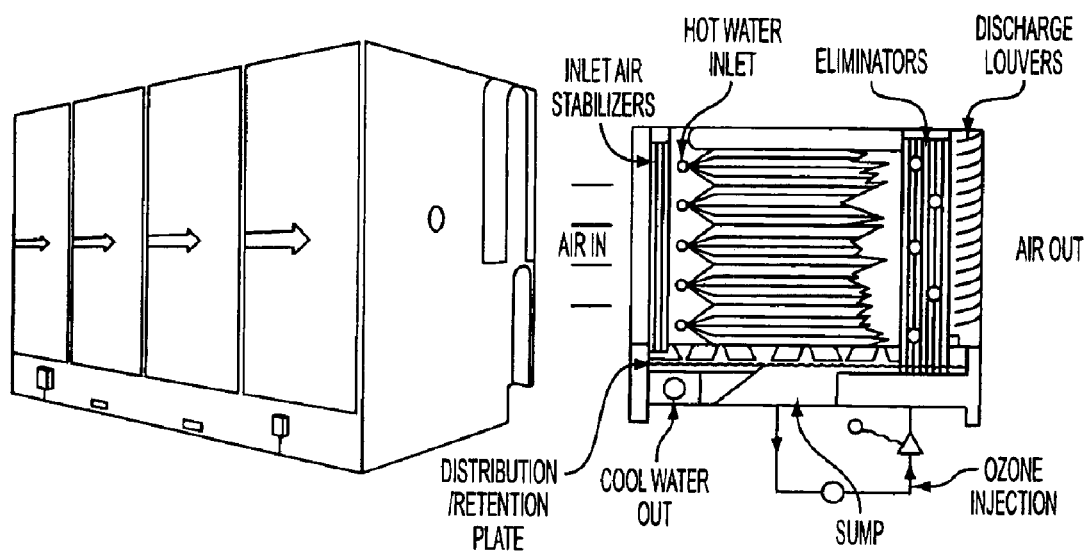
FIG. 7 is a partially schematic, partially diagrammatic view of the distribution/retention plate as applied in a cooling tower.
Figure 7:
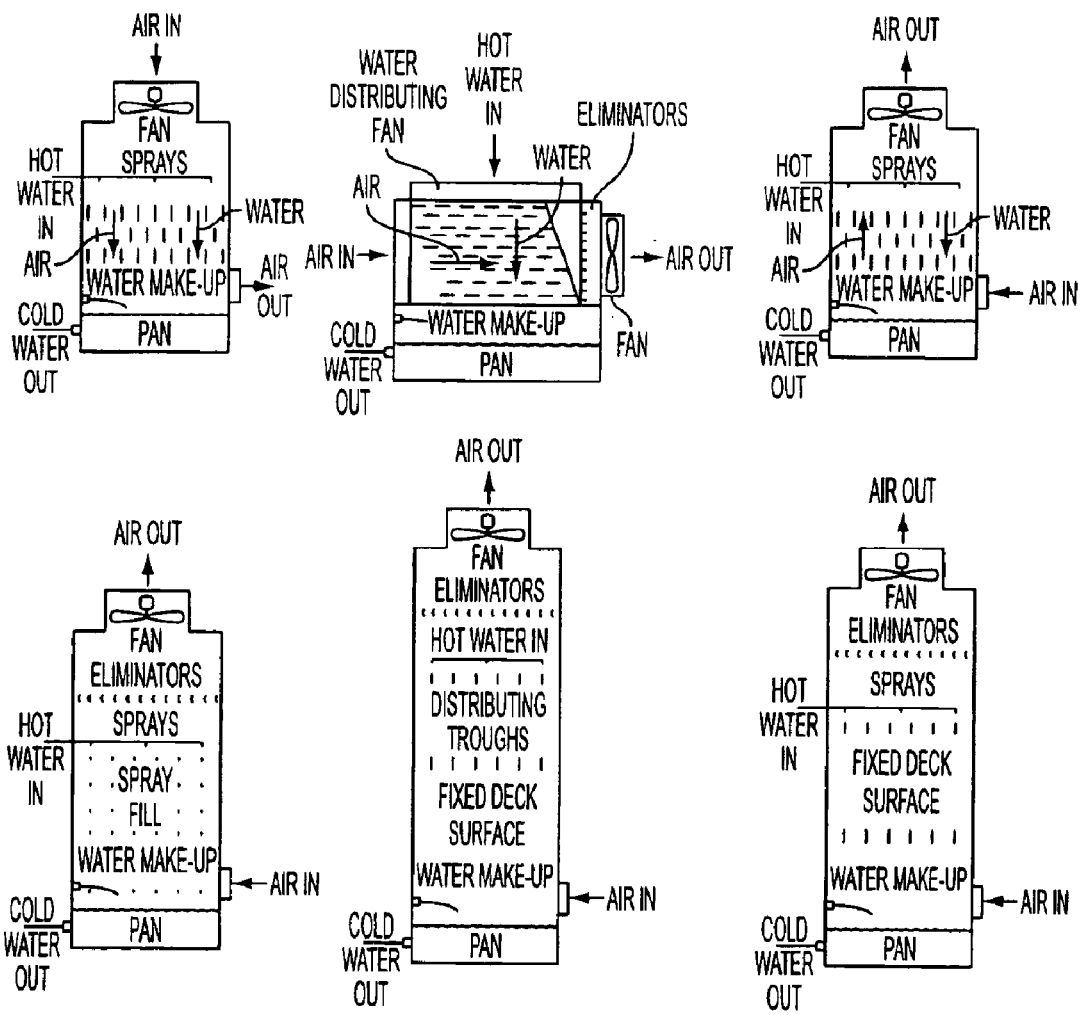

In an alternative embodiment depicted in FIGS. 6A and 6B, the distribution/retention plate can be used in automatic ice-making systems utilizing ozonated water. An exemplary ice-making system for which the distribution/retention plate of the present invention could be utilized is disclosed in U.S. Pat. No. 6,334,328 to Brill. In another alternative embodiment depicted in FIG. 7, the distribution/retention plate can be used in a cooling tower utilizing ozonated water. Ozonated water utilized in a cooling tower and its system provides excellent control over bacteriological growth throughout the entire water circuit. For more information on the use of ozone for maintaining water in cooling tower applications, see Joseph T. Echols & Sherman T. Mayne, *Cooling tower management using ozone instead of multichemicals*, ASHRAE Journal, June 1990.

Figure 8:
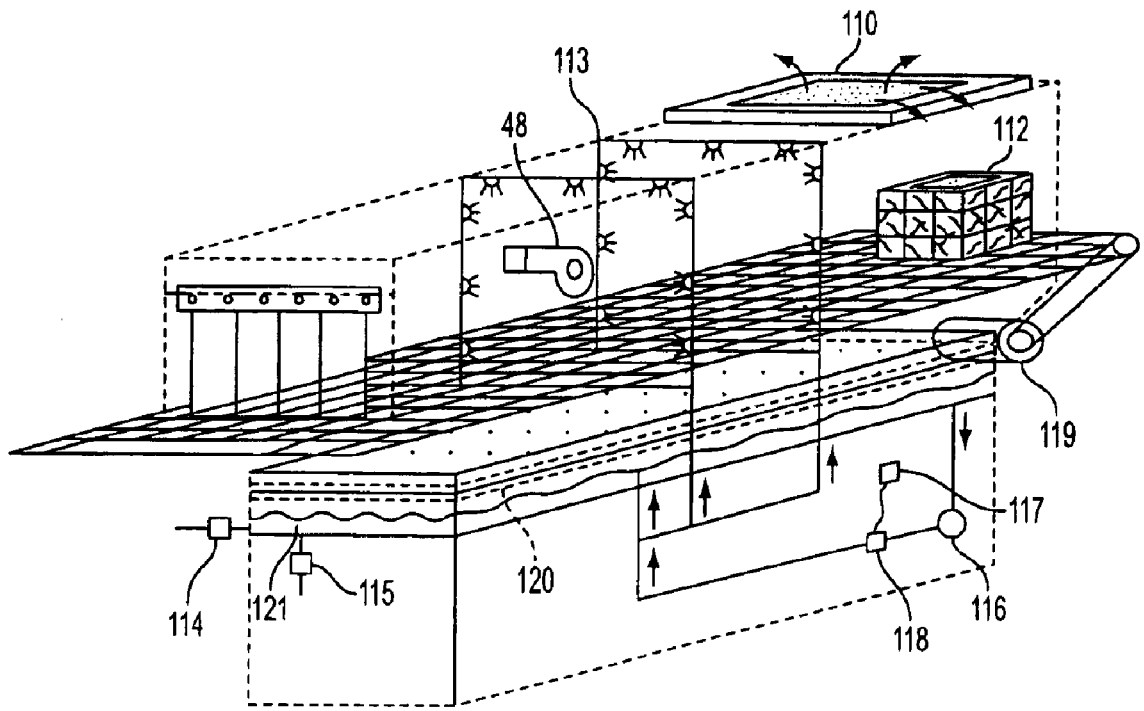
FIG. 8 is a partially schematic, partially diagrammatic view of the distribution/retention plate as applied in a commercial conveyor-driven perishable food washing system.

In yet another alternative embodiment depicted in FIG. 8, the distribution/retention plate can be utilized in a commercial conveyor-driven perishable food washing system. Conveyor system 100 operates in much the same manner as above, and the design considerations for and operation of conveyor distribution/retention plate 120 are likewise the same. Food products 112 are placed on a conveyor driven by conveyor motor 119. As the food products travel along the conveyor, conveyor spray nozzles 113 apply ozonated water to the products. Ozone is introduced into the system by conveyor venturi 118 and conveyor water pump 116 drawing ozone from conveyor ozone generator 117 as described above. Conveyor distribution/retention plate 120 minimizes ozone off-gassing from water in conveyor reservoir 121, which can be filled from conveyor water inlet line 114 and drained from conveyor drain valve 115. Conveyor off-gas destruct housing 110 eliminates residual ambient ozone. The system may also include blower 48 which functions to remove excess water from food products 112 before they exit conveyor system 100.

Figure 9:
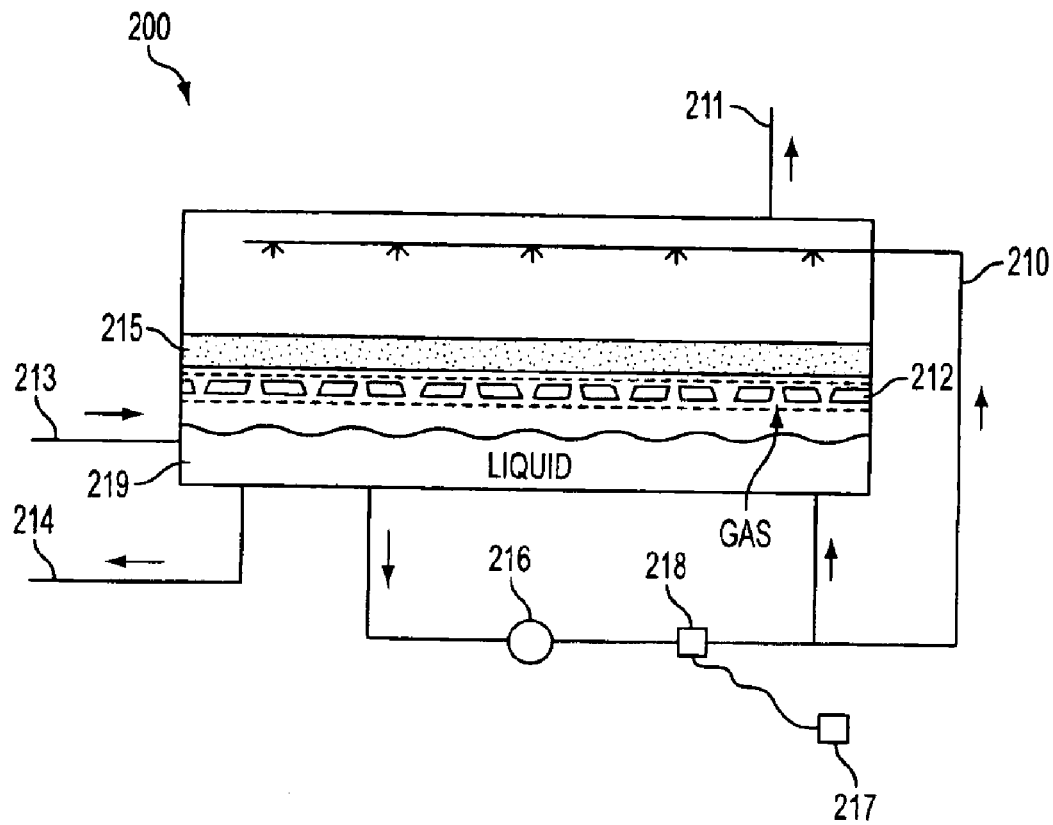
FIG. 9 is a partially schematic, partially diagrammatic view of the distribution/retention plate as applied in a process water treatment system.

In another alternative embodiment depicted in FIG. 9, the distribution/retention plate can be utilized in a process water treatment system. Process water enters process water treatment system 200 for disinfection at 213. Ozone is introduced into the system by process water ozone generator 217, process water venturi 218, and process water pump 216. Process water distribution/retention line 210 sprays ozonated water into the system, and the water is filtered by process water filter 215. Process water distribution/retention plate 212 minimizes ozone off-gassing from process water reservoir 219. Disinfected water is withdrawn from the system at 214, and off-gasses are withdrawn for destruction at 211. As with the other alternative embodiments, the system operates in much the same manner as described above, and the design considerations for and operation of the process water distribution/retention plate are likewise the same.

Figure 10:
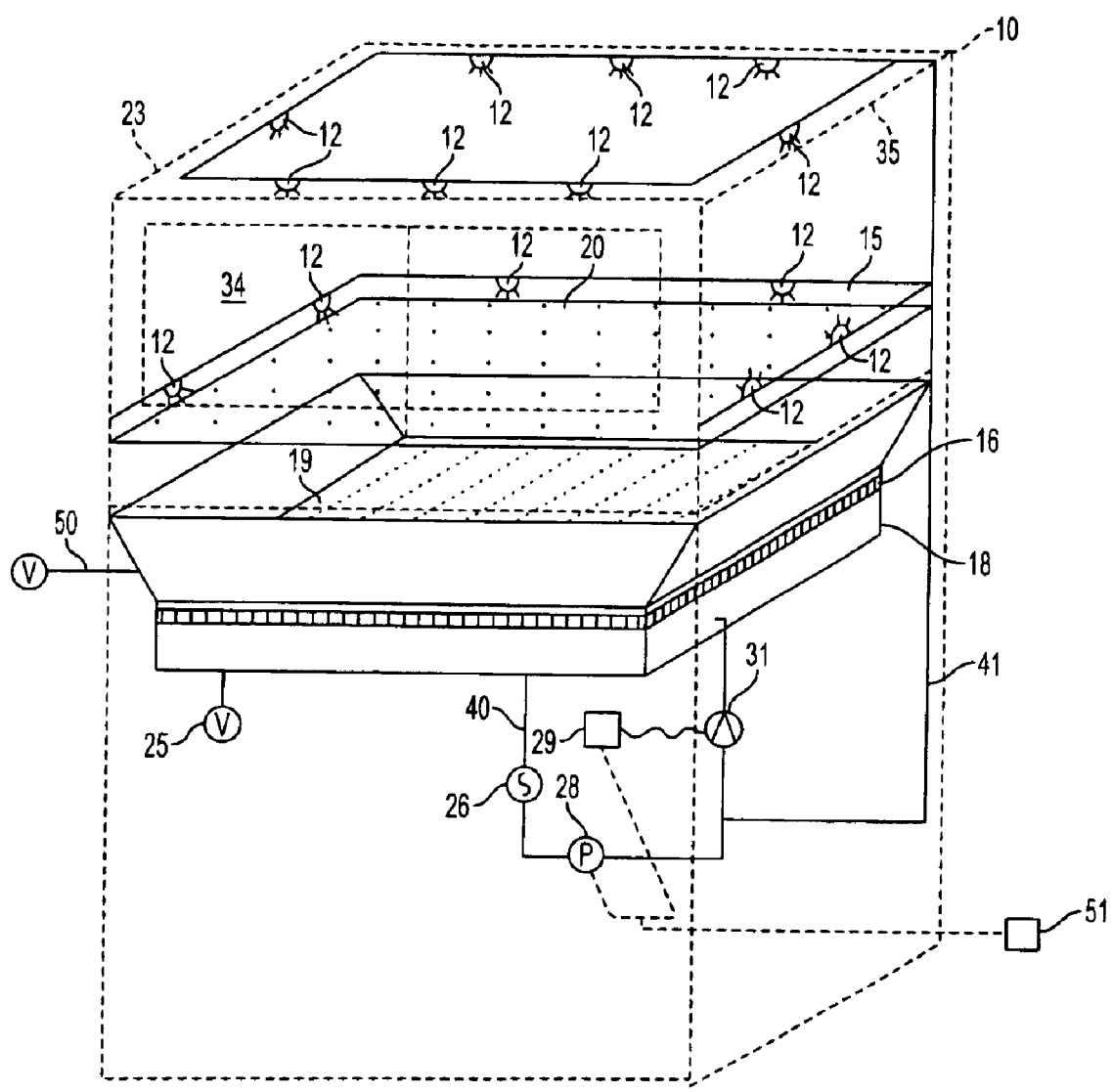
FIG. 10 is a partially schematic, partially diagrammatic view of a simplified apparatus of the present invention as embodied in a counter-top food washing system.

FIG. 10 illustrates a simplified embodiment of the present invention as an affordable counter-top system designed for individual consumer use. The system is manually filled with water through fill line 50 and is drained via manual drain valve 25 located at the base of the system. When the system is filled with water manual minute timer/combination switch 51 energizes to provide power to ozonated water supply line pump 28 and ozone generator 29 to initiate the treatment cycle. All components are contained in containment housing 23. Treatment chamber access door 20 allows food items to be placed onto loading plate 15. The process water passes through loading plate 15 and particulate drain filter 19 and onto distribution/retention plate 16, which operates on the same principles as discussed above. The water flows through distribution/retention plate 16 and into reservoir 18. Ozone is introduced into the system through ozonated water supply line 40. Ozonated water supply line pump 28 draws water from reservoir 18 and through ozonated water supply line strainer 26 and venturi injector 31. Ozone generator 29 provides ozone to the suction port of the venturi injector, causing ozone to be dynamically entrained into the motive water stream. The ozone-entrained water flows from the outlet of venturi injector 31 back to reservoir 18 to complete the recirculation cycle. Ozonated water is supplied to spray nozzles 12 by spray line 41. In this embodiment, ozonated water is supplied to spray line 41 from ozonated water supply line 40 after ozonated water supply line pump 28 and before venturi injector 31. In an alternative embodiment, the spray line includes another branch with a manual or electric drain valve (not shown) which provides a method to pump water out of the system or to provide a flow of ozonated water for a treatment process external to the system.

As discussed, the system of the present invention can be easily and quickly operated by a user to disinfect consumer goods such as food products or the like. The invention is particularly suited to disinfect bacteria such as *Escherichia coli*. In an example of operation in a preferred embodiment, a customer selects fresh produce from the supermarket shelves for disinfection. The system of the present invention is continuously running and conveniently located in the produce section of the supermarket. The customer operates the spray line switch 42, which redirects water from spray nozzles 12 and into reservoir 18. The customer simply opens treatment chamber access door 20, places the fresh produce onto loading plate 15, and closes the access door. The customer operates spray line switch 42 to commence disinfection and waits approximately 2 to 3 minutes. A light or timer can be provided to notify the customer when disinfection is complete. At such time the customer operates spray line switch 42, which shuts off spray nozzles 12. Thus, the goal of disinfecting food products as close to the plate as possible has been accomplished.

A system involving the concepts of the present invention has been successfully built and tested. Testing of the system was performed on at least two occasions by Presque Cultures, 3804 West Lake Road, Erie, Pa. 16505 under the direction of Richard Gammon, Ph.D. The test procedure and results are described as follows:

Test #1 (Mar. 1, 2002)

*Escherichia coli* ATCC 25922 was inoculated on a series of food surfaces so as to achieve greater than $1 \times 10^6$ bacteria per inoculation. A control inoculation conducted on a grape, with a $1 \times 10^{-6}$ dilution, resulted in an average of $1.3 \times 10^8$ bacteria. The food surfaces, which included nectarine, tomato, apple, plum, and pepper, were individually placed in the apparatus for both 3 and 4-minute ozone washes and then tested for residual *E. coli* bacteria. At a $1 \times 10^{-4}$ dilution, the residual level of *E. coli* bacteria was zero. This corresponds to a reduction in biological load of at least 4 logs, or 99.99%. In addition, after each test aliquots of reservoir water were negative for coliform following standard membrane filtration and culturing/incubation on M-Endo Broth.

Test #2 (Nov. 12, 2002)

0.01 mL of a 48-hour *escherichia coli* culture was inoculated on a series of food surfaces. A control inoculation conducted on a grape, with $1 \times 10-6$ dilution, resulted in an average of $1.4 \times 107$ bacteria. The inoculated food surfaces, which included lettuce, pear, apple, and pepper, were dried and then exposed for three minutes in a prototype of the present invention at a water temperature of 62–70 degrees Fahrenheit. The resulting tests indicated a 99.96% reduction in biological load on the lettuce, 99.99% reduction in biological load on the pear, and >99.999% reduction in biological load on the apple and pepper. In addition, aliquots of reservoir water were negative for coliform following standard membrane filtration and culturing/incubation on M-Endo Broth.

By reducing the amount of ozone and water that is necessary to achieve the desired results, the apparatus of the present invention enables the same types and quantities of materials to be treated as other ozone-treatment systems, but at a lower cost and physical size.

While the invention has been described in connection with what are presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

I claim:

1. An apparatus for promoting the efficient use of gases dissolved in a liquid by limiting the amount of off-gassing from the liquid, the apparatus comprising:
   a treatment chamber;
   a liquid reservoir; and
   a distribution/retention plate separating the treatment chamber from the liquid reservoir,
   wherein the distribution/retention plate comprises at least one downward flow passage to promote the flow of liquid from the treatment chamber to the liquid reservoir and a pressure relief device to maximize pressure in the liquid reservoir and limit off-gassing from liquid in the liquid reservoir.

2. The apparatus of claim 1, wherein the pressure relief device comprises at least one upward flow passage in the distribution/retention plate.

3. The apparatus of claim 2, wherein the at least one upward flow passage has a larger diameter at the bottom of the distribution/retention plate and tapers to a smaller diameter at the top of the distribution/retention plate.

4. The apparatus of claim 3, wherein the at least one upward flow passage further comprises a tapered recessed cavity at the top of the distribution/retention plate.

5. The apparatus of claim 1, wherein the pressure relief device comprises at least one check valve to maximize pressure in the liquid reservoir and limit off-gassing from liquid in the liquid reservoir.

6. The apparatus of claim 5, wherein the pressure relief device further comprises at least one upward flow passage in the distribution/retention plate.

7. The apparatus of claim 1, further comprising a seal around the perimeter of the distribution/retention plate to minimize the amount of liquid and gas that bypasses the distribution/retention plate.

8. The apparatus of claim 1, wherein the pressure relief device comprises a pressure relief valve to vent off-gassing from the liquid in the liquid reservoir.

9. The apparatus of claim 8, wherein the pressure relief device further comprises at least one upward flow passage in the distribution/retention plate.

10. The apparatus of claim 1 as utilized in a portable food washing system.

11. The apparatus of claim 1 as utilized in an automatic ice making system.

12. The apparatus of claim 1 as utilized in a cooling tower system.

13. The apparatus of claim 1 as utilized in a conveyor-driven food washing system.

14. The apparatus of claim 1 as utilized in a process water treatment system.

15. The apparatus of claim 1 as utilized in a counter-top food washing system.

16. A method for reducing microorganisms on the surface of a material comprising the steps of:

producing ozonated water by generating ozone and injecting it into water in a liquid reservoir;

exposing the surface of a material to molecules of ozone in a treatment chamber by spraying the ozonated water onto the surface of the material; and recycling the water while utilizing a distribution/retention plate located between the treatment chamber and the liquid reservoir, wherein the distribution/retention plate has at least one downward flow passage to promote the flow of liquid from the treatment chamber to the liquid reservoir and a pressure relief device to maximize pressure in the liquid reservoir and limit off-gassing from liquid in the liquid reservoir.

17. The apparatus of claim 1, wherein the at least one downward flow passage has a larger diameter at the top of the distribution/retention plate and tapers to a smaller diameter at the bottom of the distribution/retention plate.

18. The apparatus of claim 8, wherein the pressure relief valve vents off-gassing to the treatment chamber.

19. The apparatus of claim 8, wherein the pressure relief valve vents off-gassing to an off-gas destruct housing.

20. An apparatus for promoting the efficient use of gases dissolved in a liquid by limiting the amount of off-gassing from the liquid, the apparatus comprising:

a treatment chamber;

a liquid reservoir;

a distribution/retention plate separating the treatment chamber from the liquid reservoir; and a pressure relief device to maximize pressure in the liquid reservoir and limit off-gassing from liquid in the liquid reservoir, wherein the distribution/retention plate comprises at least one downward flow passage to promote the flow of liquid from the treatment chamber to the liquid reservoir.

21. The apparatus of claim 20, wherein the pressure relief device comprises at least one upward flow passage in the distribution/retention plate.

22. The apparatus of claim 21, wherein the at least one upward flow passage has a larger diameter at the bottom of the distribution/retention plate and tapers to a smaller diameter at the top of the distribution/retention plate.

23. The apparatus of claim 22, wherein the at least one upward flow passage further comprises a tapered recessed cavity at the top of the distribution/retention plate.

24. The apparatus of claim 20, wherein the pressure relief device comprises at least one check valve to maximize pressure in the liquid reservoir and limit off-gassing from liquid in the liquid reservoir.

25. The apparatus of claim 24, wherein the pressure relief device further comprises at least one upward flow passage in the distribution/retention plate.

26. The apparatus of claim 20, wherein the at least one downward flow passage has a larger diameter at the top of the distribution/retention plate and tapers to a smaller diameter at the bottom of the distribution/retention plate.

27. The apparatus of claim 20, further comprising a seal around the perimeter of the distribution/retention plate to minimize the amount of liquid and gas that bypasses the distribution/retention plate.

28. The apparatus of claim 20, wherein the pressure relief device comprises a pressure relief valve to vent off-gassing from the liquid in the liquid reservoir.

29. The apparatus of claim 28, wherein the pressure relief valve vents off-gassing to the treatment chamber.

30. The apparatus of claim 28, wherein the pressure relief valve vents off-gassing to an off-gas destruct housing.

31. The apparatus of claim 28, wherein the pressure relief device further comprises at least one upward flow passage in the distribution/retention plate.

32. The apparatus of claim 20 as utilized in a portable food washing system.

33. The apparatus of claim 20 as utilized in an automatic ice making system.

34. The apparatus of claim 20 as utilized in a cooling tower system.

35. The apparatus of claim 20 as utilized in a conveyor-driven food washing system.

36. The apparatus of claim 20 as utilized in a process water treatment system.

37. The apparatus of claim 20 as utilized in a counter-top food washing system.

38. A method for reducing microorganisms on the surface of a material comprising the steps of:

producing ozonated water by generating ozone and injecting it into water in a liquid reservoir;

exposing the surface of a material to molecules of ozone in a treatment chamber by spraying the ozonated water onto the surface of the material; and recycling the water while utilizing a distribution/retention plate located between the treatment chamber and the liquid reservoir, wherein the distribution/retention plate has at least one downward flow passage to promote the flow of liquid from the treatment chamber to the liquid reservoir, and the liquid reservoir has at least one pressure relief device to maximize pressure in the liquid reservoir and limit off-gassing from liquid in the liquid reservoir.

* * * * *